July 2, 1963 E. F. KEON 3,096,083
ANISOTROPIC HEAT-CONTROLLING BODY AND METHOD
FOR MANUFACTURE THEREOF
Filed Aug. 24, 1959

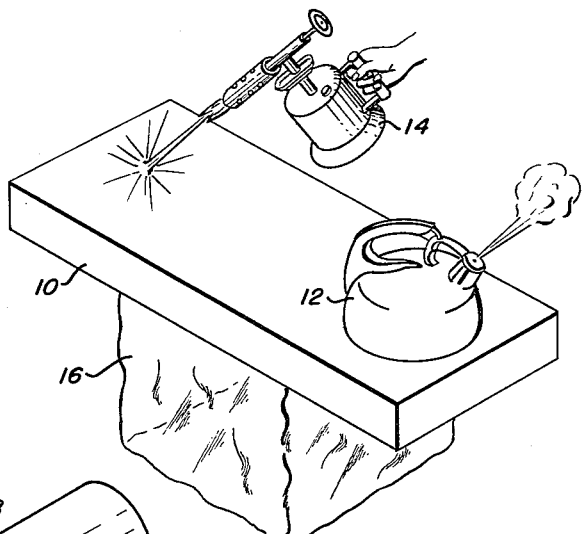

FIG. 1

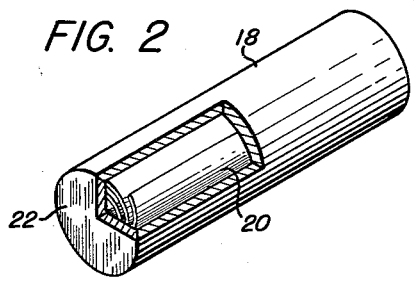

| HEAT INERT BASE TO TEMPERATURE AT LEAST EQUAL TO DECOMPOSITION TEMPERATURE OF CARBONACEOUS GAS. (E.G., 2100°C) | → | CUT OR MACHINE FREE-STANDING BODY TO DESIRED FINAL SHAPE |
|---|---|---|
| ↓ | | ↑ |
| IMMERSE HEATED BASE IN GAS ATMOSPHERE FOR PERIOD SUFFICIENT TO FORM COATING OF DESIRED SELF-SUPPORTING THICKNESS. (E.G. 1/8 INCHES) | → | REMOVE BASE FROM SELF-SUPPORTING COATING. |

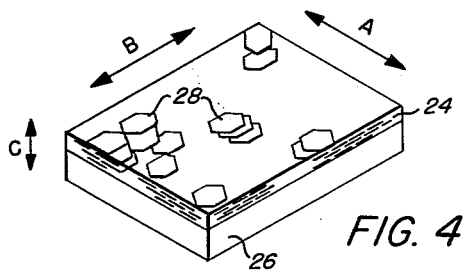

FIG. 4

INVENTOR
EDWARD F. KEON
BY *N. Vincent Harsha*
ATTORNEY

United States Patent Office 3,096,083
Patented July 2, 1963

3,096,083
ANISOTROPIC HEAT-CONTROLLING BODY AND METHOD FOR MANUFACTURE THEREOF
Edward F. Keon, Lowell, Mass., assignor to Raytheon Company, Lexington, Mass., a corporation of Delaware
Filed Aug. 24, 1959, Ser. No. 835,618
5 Claims. (Cl. 263—2)

This invention pertains to thermally anisotropic bodies for controlling the direction of heat flow, as well as to a method for the manufacture of such bodies.

The problem of controlling the flow of heat, whether with respect to the prevention of heat flow (as in the art of thermal insulation) or with respect to the enhancement of heat flow (in order to dissipate heat readily from a hot-spot or the like), is present in a multitude of different fields of endeavor, and the solutions to the problem are numerous. The prior art affords many examples of heat-controlling members, some being characterized by rather low thermal conductivity so as to provide good thermal insulation between a heat source and an object which is to be protected therefrom, and others being characterized by relatively high thermal conductivity so as both to provide a ready avenue of heat dissipation for a heat source or hot-spot and to serve as a heat sink for the heat so conducted. The heat-controlling members of the prior art have generally fallen into either one or the other of these categories, being considered either a good thermal conductor or a good thermal insulator. For example, most high-temperature metals, such as tungsten, tantalum, molybdenum and the like, are good conductors of heat, and bodies of such materials readily serve as heat sinks and other heat dissipating means. A common example of a thermally insulating material is asbestos, which is available commercially in several forms. Another, and not so common, example of thermally insulating material is found in ablative plastics, which provide thermal insulation through the absorption of heat connected with the ablation of the plastic material.

In each of these materials of the prior art the thermal characteristics are substantially isotropic. In some instances, the difference between the thermal conductivities measured in mutually orthogonal directions is so small as to be practically unmeasurable, and even where the difference is measurable, the ratio of the two conductivities is on the order of only two-to-one, or even less. As a result of this lack of thermal anisotropy in the prior art materials, the heat-controlling members available in the past were either thermal insulators (as a result of their poor thermal conductivity) or dissipative heat sinks which absorb heat in conducting it way from a hot spot or the like (due to their good thermal conductivity). Therefore, no heat-controlling bodies have been available which would both insulate against heat flow and, at the same time, provide a means for dissipating heat by the rapid conduction thereof away from the source. As is readily apparent, a tremendous advantage may be realized over the prior art by the use of a thermally anisotropic protective wall or the like between a heat source and a nearby object which is to be thermally insulated from such source. Where the anisotropic wall is positioned between the heat source and the protected object in the proper orientation, with its direction of poor thermal conductivity parallel with a line between the source and the object and its direction of high thermal conductivity perpendicular to such line, heat emanating from the source not only is prevented from reaching the protected object, but the heat is dissipated by conduction away from the local area. Stated in an alternative manner, where it is desirable to confine the flow of heat from a source so that it flows in a desired direction without being dissipated by undesired flow in other directions, a properly oriented body exhibiting thermal anisotropy will conduct this heat readily in the desired direction and also prevent its escape in other directions.

It is accordingly a primary object of the present invention to provide a heat-controlling body having a pronounced degree of thermal anisotropy.

Another object of the invention is to provide a thermally anisotropic heat-controlling body characterized by extremely high thermal conductivity along a surface thereof and extremely low thermal conductivity through the thickness thereof.

An additional object of this invention is to provide a thermally anisotropic heat-controlling body characterized by extremely low thermal conductivity along a surface thereof and extremely high thermal conductivity through the thickness thereof.

In accordance with the present invention, the above and other objects are achieved by means of a thermally anisotropic heat-controlling body of pyrolytically formed graphite. While the pyrolytic deposition of graphite as a coating on a suitably inert substrate is not new, the present invention is the first disclosure of free-standing or self-supporting bodies of pyrolytically formed graphite. In addition, and what is of at least equal importance, the present invention is the first disclosure of the extreme thermal anisotropy of pyrolytically formed graphite characterized by respectively high and low degrees of heat conductivity in mutually orthogonal directions, and it is the culmination of long and arduous research directed toward providing vastly improved heat-controlling bodies.

In making use of the pronounced thermal anisotropy of objects of pyrolytically formed graphite, the present invention provides a first practical success in the control of heat flow in many applications in which the requirements have been too extreme for the prior art to meet. For example, the extreme thermal anisotropy of a thermally insulating member in accordance with the present invention provides outstandingly better insulation than the prior art, since heat from a source is not only prevented from being conducted in the undesired direction, but is simultaneously dissipated by large thermal conduction in another direction. In achieving this new and unobvious result, the present invention includes concepts which have appeared disadvantageous to prior workers in the art.

In short, the present invention contemplates the provision of a heat-controlling member or body of pyrolytic graphite, the thermal anisotropy of which affords the desired characteristics. In the method of the invention, an inert base or substrate is heated to a tempeature at least equal to the decomposition or cracking temperature of a carbonaceous gas (e.g., 2100 degrees centigrade). The carbonaceous gas is then flowed over the heated substrate (or at least a portion thereof) for a time sufficient to form a coating or deposit of a desired self-supporting or free-standing thickness (e.g., ⅛ inch), and the substrate is thereafter removed (preferably after a cooling period) from the member of pyrolytic graphite. The form of the inert substrate generally determines that of the desired heat-controlling body, but where desired, the body so formed may be cut or machined or otherwise altered in form so as to provide some other particular configuration.

With the above considerations and objects in mind, the invention itself will now be described in connection with a preferred embodiment thereof given by way of example and not of limitation, and with reference to the accompanying drawings, in which:

FIG. 1 is a pictorial view, illustrating the thermal anisotropy of a heat-controlling body of the present invention;

FIG. 2 is a perspective view of an exemplary form of heat-controlling body in accordance with the present invention;

FIG. 3 is a block diagram illustrating the method of the present invention; and

FIG. 4 is a perspective view of a substrate member with a coating of pyrolytic graphite thereon, illustrating graphically the crystalline lattice structure of the latter.

FIG. 1 of the drawings is a pictorial illustration of the anisotropy present in a heat-controlling body in accordance with the present invention. The thermally anisotropic body is shown as a bar or plate 10 which supports a teakettle 12, or the like, on the upper surface thereof, such surface being subjected to a source of heat, represented by the flame from the blowtorch 14. A cake of ice 16 is in contact with the under surface of the heat-controlling body 10, and the latter is supported thereby. The teakettle 12 is shown whistling with the emission of steam, denoting the fact that the heat from the blowtorch 14 readily travels along the surface of the body 10, while the block of ice 16 is shown in a dry, cold state, indicating that the body 10 does not conduct heat through the thickness thereof. It will of course be understood by those skilled in the art that the thickness of the body 10 will not necessarily be so great as to provide the mechanical strength necessary to support an object as heavy as a teakettle, especially in the manner shown in FIG. 1; this figure of the drawings is intended merely to be a graphic illustration of the heat-flow characteristics involved. The actual thickness of the body 10 will depend upon the mechanical strength requirments of the particular application to which the heat-controlling body is intended to be put.

One practical application, and a very simple one, for the thermally anisotropic bodies of the present invention is shown in FIG. 2, wherein a tubular member 18 formed in accordance with the present invention provides thermal protection for an object contained therein, such object being illustrated in FIG. 2 as a rolled document 20 or the like. As will be better understood in connection with the description that follows, the heat-controlling body 18 is conveniently formed by deposition on a suitable base or substrate member (not shown). In the particular case of the hollow cylinder 18 of FIG. 2, the method of forming the body may involve the coating of the outside of a substrate, or many equally well include the coating of the inner surface of a tubular substrate. With either of these two forms of deposition employed, the body 18 will readily conduct heat along its cylindrical surfaces, while resisting the flow of heat through the thickness in the radial direction. Suitable end-plates, one of which is shown at 22, may be employed to complete the container for document 20, so that the latter may effectively be thermally insulated from any heat source (such as a fire) external to the container.

The block diagram of FIG. 3 illustrates the preferred form of the method for the manufacture of heat-controlling bodies in accordance with the present invention. As a first step in the process, a suitably shaped (i.e., shaped in accordance with the desired shape of the object to be formed) thermally inert base member or substrate is heated to a temperature at least as great as the decomposition or cracking temperature of the particular carbonaceous gas to be employed (e.g., 2100 degrees centigrade). Typical gases of this nature which are suitable for use in the method of the invention are methane, ethane, propane, benzene and carbon tetrachloride, all but the last-mentioned one being hydrocarbon gases. A typical substrate or base member is formed of graphite. Next, the heated substrate is immersed in an atmosphere of the carbonaceous gas that is chosen, the immersion being for a period of time sufficient to permit the formation of a deposition of graphite from the gaseous atmosphere of sufficient thickness to render the deposited graphite self-supporting when removed from the substrate. Exemplary thicknesses for bodies of pryrolytically deposited graphite are on the order of one-eighth to one-fourth of an inch, but it is to be understood that the present invention is not limited to the specific thickness of the coating formed on the substrate. The actual thickness of a particular body will, of course, depend upon the mechanical or structural requirements of the particular use to which the heat-controlling body is to be put.

When a sufficient amount of graphite is thus deposited on the substrate, the formed body is removed therefrom, preferably after cooling, and such free-standing or self-supporting body may then be employed as a heat-controlling body in its then form, or, alternatively, it may be cut or machined or otherwise modified in form so as to provide some other desired final shape. In this connection, and as will be further explained in the description relating to FIG. 4 of the drawings, it is important to note that the direction of high thermal conductivity in such bodies of pyrolytically deposited graphite is parallel to the surface of the substrate upon which the deposit is formed. The direction of poor thermal conductivity is perpendicular to such substrate surface. Taking a cylindrical substrate as an example, the pyrolytic graphite body resulting from the method of the invention may take the form of a hollow cylinder whose internal diameter substantially corresponds to the outer diameter of the substrate. In such a body, heat is readily conducted along the cylindrical surfaces, but very little heat transfer takes place in the orthogonal direction, radially of the cylindrical body. Since a cylinder is generally thought of as being a body having a greater longitudinal dimension than thickness, the thermal characteristics of the cylindrical heat-controlling body so formed may be generalized in the statement that the heat flows readily along the surface of the body, but not through such body. Obviously, if a thin slice transverse to the axis of the cylinder were to be employed as the heat-controlling body, the heat applied to such body would be said to flow readily through the thickness thereof, with little or no heat being conducted along its surface.

With respect to the removal of the pyrolytic graphite body from the substrate, and, again, referring to a hollow cylindrical body formed by pyrolytic deposit upon a cylindrical base member, as a result of the fact that the body of graphite tends to swell or expand as it is formed, it may easily be removed from the substrate where the deposition is made upon the outer surface of the cylindrical substrate; in such case, it is often merely necessary to remove the loose substrate from within the formed body. Where, on the other hand, the deposition is made, for one reason or another, upon the inner surface of a hollow cylindrical substrate, such base member must either be cut away from the graphite body, or, preferably, be in the form of a split mold or the like so as to be easily removable from the internally-formed body.

As previously stated, many materials are characterized by a very small difference between their thermal conductivities in mutually orthogonal directions. In the materials of the prior art, the ratios of such thermal conductivities are quite small, being on the order of two-to-one or substantially less. In sharp contrast thereto, the heat-controlling bodies of the present invention are characterized by thermal anisotropies as great as five hundred-to-one. As will be understood by those skilled in the art, this large degree of anisotropy represents a tremendous stride forward in the techniques of heat-flow control, the difference between the characteristics of bodies formed in accordance with the present invention and those of the prior art being a difference of kind or basic nature, rather than merely one of degree. The research efforts expended in the achievement of the discovery of the present invention disclose that pyrolytically formed graphite is, in one plane, a better conductor of heat than any material previously known, and in a plane perpendicular to such first plane such material is substantially the poorest thermal conductor known. The two extremes of thermal conductivity are combined in a single body to present to the art for the first time a heat-controlling body having such startlingly different characteristics. Concomitantly, the pyrolytic graphite members of the present invention are substantially impervious to gases, thus providing additional advantages in many applications.

No effort will be made herein to explain in detail the reasons for the extreme anisotropy of the heat-controlling bodies of the present invention, since the behavior is not fully understood at present. However, the difference in the thermal conductivities is believed to be based upon the high degree of ordering of the elements of the crystalline lattice structure of the pyrolytically-deposited graphite. Such structure is shown schematically in FIG. 4, wherein a body 24 of pyrolytic graphite is shown as deposited on a substrate 26. The crystalline structure of the graphite layer 24 is indicated by the series of connected polygons 28, which lie in planes parallel to the upper surface of the substrate 26. The orientation of these parallel planes is given the notation "the A—B plane," and the thermal conductivity in the A—B direction is extremely high. The thickness direction of the graphite member 24 is denoted as the "C" direction, and the thermal conductivity of member 24 in this direction is very low.

It is important to note that the conditions under which the pyrolysis takes place must be carefully controlled in order to produce a body having good structural integrity. This is not to say that there is any one temperature, rate of gas flow, or other operating condition which must be adhered to in order to produce a satisfactory body, since different temperatures, rates of gas flow, etc., as well as different combinations thereof, serve to produce different but satisfactory results for different requirements. What is important is that for a given set of operating conditions initially established, an effective control must be maintained thereover so as to prevent radical changes therein during the deposition. Typical faults that otherwise occur are surface blisters, internal bubbles and external "whiskers" or fragments. As a result of this need for control of the operating conditions, it is generally desirable to perform the deposition in a suitably closed container from which the air has been expelled prior to the introduction of the carbonaceous gas.

The invention has been described above in some detail, and particularly with reference to its application to the formation of cylindrical bodies. However, it will be apparent to those skilled in the art that the invention is also applicable to bodies of many other shapes. For example, the body may be spherical, conical, flat or some other suitable shape, depending upon the form of the substrate. In addition, the thickness of the deposited graphite may be made to be nonuniform within a given member (in order, for example, to meet particular structural requirements) by selectively exposing areas of the substrate surfaces to different amounts of the carbonaceous gas, as by moving a spray of such gas along the deposit surface in a programmed manner. Hence, the invention is not to be considered as limited to the particular details given, nor to the specific application to which reference has been made during the description of the article and the method for the manufacture thereof, except insofar as may be required by the scope of the appended claims.

What is claimed is:

1. A system comprising a source of heat, an object to be heated, a body to be heat isolated, and a member of pyrolytic graphite characterized by respectively high and low degrees of heat conductivity in mutually orthogonal directions spaced in heat conducting relation to said object to be heated and said source of heat and oriented in the direction parallel to that of low heat conductivity to said body to be heat isolated.

2. A heat system comprising a source of heat, and a member of pyrolytic graphite characterized by respectively high and low degrees of heat conductivity in mutually orthogonal directions therein and of a self-supporting thickness arranged in heat-transferring relation to said source of heat and oriented along the direction parallel to that of high heat conductivity.

3. A heat system comprising a source of heat, a heat sink, a body to be heat isolated, and a member of pyrolytic graphite characterized by a crystalline lattice structure having respectively high and low degrees of heat conductivity in mutually orthogonal directions therein and of a self-supporting thickness arranged in heat-transferring relation with said source of heat and said heat sink along the direction parallel to that of high heat conductivity and in a direction substantially orthogonal thereto with respect to said body to be heat isolated.

4. A method of transferring heat comprising the steps of generating a source of heat, transferring said heat to a body characterized by a crystalline lattice structure having respectively high and low degrees of heat conductivity in mutually orthogonal directions therein formed by heating an inert base member to a temperature not less than the temperature of decomposition of a carbonaceous gas, immersing said heated base member in an atmosphere of such gas for a period sufficient to form a coating thereon of a self-supporting thickness, and thereafter removing said base member.

5. A method of transferring heat comprising the steps of generating a source of heat, transferring said heat to a body characterized by a lattice structure having respectively high and low degrees of heat conductivity in mutually orthogonal directions therein formed by a free-standing member of pyrolytic graphite formed by heating an inert base member to a temperature not less than the temperature of decomposition of a carbonaceous gas, immersing said heated base member in an atmosphere of such gas for a period sufficient to form a coating thereon of a self-supporting thickness, thereafter removing said base member, and subsequently cutting said self-supporting coating to a desired final shape.

References Cited in the file of this patent

UNITED STATES PATENTS

| 338,542 | McTighe | Mar. 23, 1886 |
| 1,392,266 | Szarvasy | Sept. 27, 1921 |
| 1,897,933 | Guthrie et al. | Feb. 14, 1933 |
| 2,062,370 | Miller | Dec. 1, 1936 |

FOREIGN PATENTS

| 274,883 | Great Britain | Aug. 30, 1928 |

OTHER REFERENCES

Article by Pirani and Fehse in Zeitschrift für Electrochemie, vol. 29, pages 168–174 inclusive. Published January 1923, by German Society.

Thermal Conductivity of Carbons and Graphite, by Mrozowski, Physical Review, 2nd series, vol. 86, April–June 1952, pages 251 and 252.

Pages 1–9 of Products Bulletin PB 7–24A, published by H. I. Thompson Fiber Glass Co. on Nov. 21, 1957.